United States Patent

Karem

[19]

[11] Patent Number: 6,007,298
[45] Date of Patent: Dec. 28, 1999

[54] OPTIMUM SPEED ROTOR

[76] Inventor: Abraham E. Karem, 25171 Calle Pradera, Lake Forest, Calif. 92630

[21] Appl. No.: 09/253,391

[22] Filed: Feb. 19, 1999

Related U.S. Application Data

[60] Provisional application No. 60/075,509, Feb. 20, 1998.

[51] Int. Cl.⁶ ..................................................... B63H 1/28
[52] U.S. Cl. .................................. 416/44; 416/43; 416/36; 416/31; 416/223 R; 416/DIG. 5; 416/1
[58] Field of Search ................................. 416/1, 35, 43, 416/44, 223 R, 25, 47, 36, 31, DIG. 5; 244/17.13, 76 R

[56] References Cited

U.S. PATENT DOCUMENTS

| | | | |
|---|---|---|---|
| 3,960,348 | 6/1976 | Fowler et al. | 244/83 D |
| 4,115,755 | 9/1978 | Cotton | 340/27 R |
| 4,427,344 | 1/1984 | Perry | 416/223 R |
| 4,632,337 | 12/1986 | Moore | 244/17.19 |
| 4,783,023 | 11/1988 | Jupe | 244/6 |

OTHER PUBLICATIONS

Proctor, *Mitsubishi Test Civil Markets With All–Japanese MH–2000* (2 pages).
Attlfellner, *Eurocopter EC 135 Qualification For The Market*, pp. 37.1–37.9.
Lockheed Model 286; Lockheed Cheyenne AH–56SA (1page).

*Primary Examiner*—Edward K. Look
*Assistant Examiner*—Ninh Nguyen
*Attorney, Agent, or Firm*—Christie, Parker & Hale, LLP

[57] ABSTRACT

A variable speed helicopter rotor system and method for operating such a system are provided which allow the helicopter rotor to be operated at an optimal angular velocity in revolutions per minute (RPM) minimizing the power required to turn the rotor and thereby resulting in helicopter performance efficiency improvements, reduction in noise, and improvements in rotor, helicopter transmission and engine life. The system and method provide for an increase in helicopter endurance and. The system and method also provide a substantial improvement in helicopter performance during take-off, hover and maneuver.

29 Claims, 13 Drawing Sheets

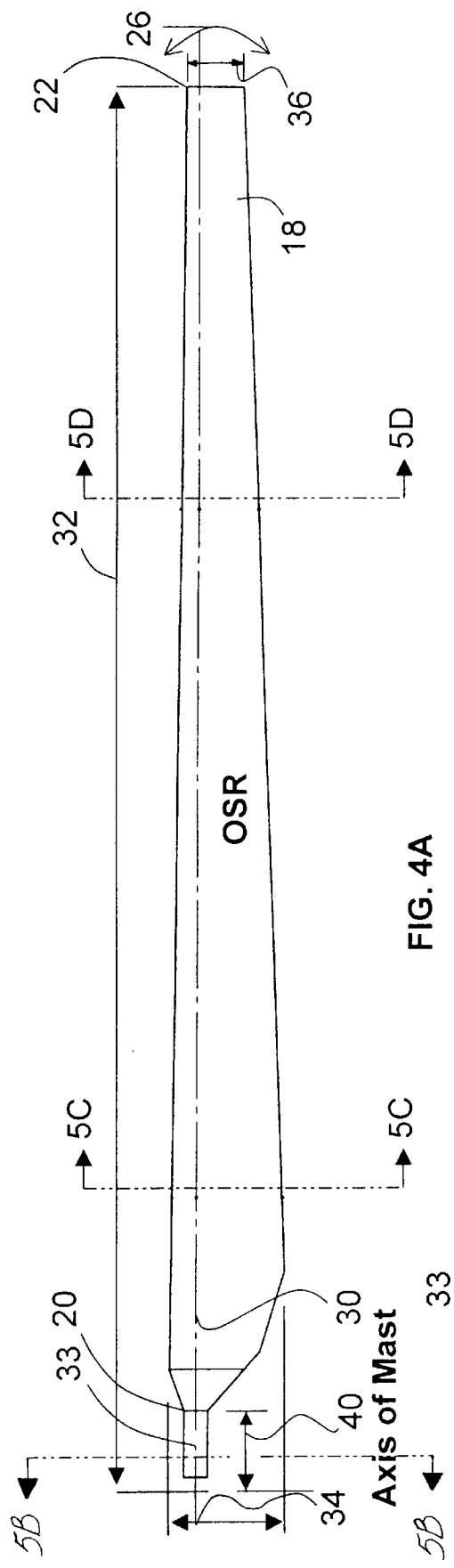
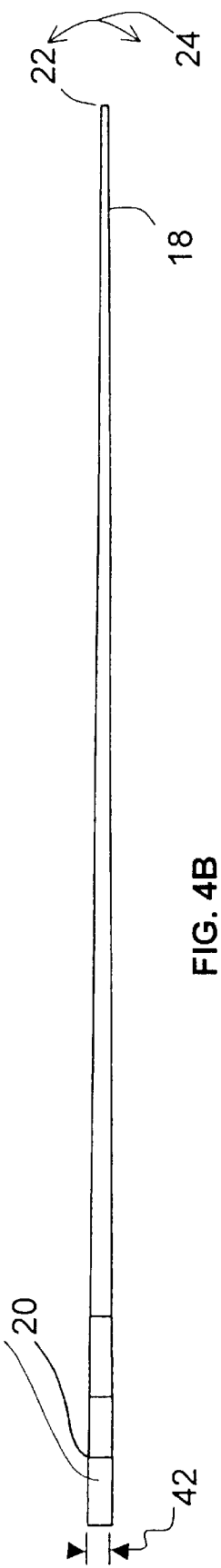
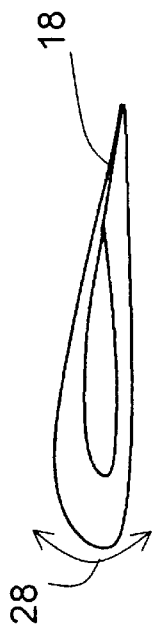
FIG. 4A
FIG. 4B
FIG. 4C

| Blade station (%) | Dimensions | | | | | Stiffness | | | Weights | |
|---|---|---|---|---|---|---|---|---|---|---|
| | radius (in) | Chord (in) | Thickness ratio | Thickness (in) | Effective spar height (in) | Spar width (in) | Flap stiffness ($10^6$ lb in$^2$) | Lag stiffness ($10^6$ lb in$^2$) | Torsional stiffness ($10^6$ lb in$^2$) | Blade section weight (lb/in) | Blade section center of gravity (%) |
| 10% | 21.5 | 17.1 | 0.190 | 3.25 | 3.20-2.40 | 3.70 | 162.78 | 178.4 | 97.1 | 0.4780 | 26.6% |
| 20% | 43.0 | 16.2 | 0.175 | 2.83 | 2.80-2.10 | 3.45 | 96.30 | 138.9 | 25.8 | 0.3844 | 26.4% |
| 30% | 64.5 | 15.3 | 0.160 | 2.45 | 2.40-1.80 | 3.20 | 58.08 | 105.9 | 16.3 | 0.3028 | 26.4% |
| 40% | 86.0 | 14.4 | 0.152 | 2.19 | 2.15-1.55 | 2.95 | 35.73 | 89.4 | 12.0 | 0.2385 | 26.7% |
| 50% | 107.5 | 13.5 | 0.145 | 1.96 | 1.90-1.33 | 2.70 | 23.61 | 68.9 | 8.9 | 0.2115 | 26.8% |
| 60% | 129.0 | 12.6 | 0.140 | 1.76 | 1.70-1.17 | 2.52 | 16.03 | 54.8 | 6.2 | 0.1870 | 26.6% |
| 70% | 150.5 | 11.7 | 0.135 | 1.58 | 1.53-1.03 | 2.34 | 10.22 | 41.6 | 4.5 | 0.1628 | 26.8% |
| 80% | 172.0 | 10.8 | 0.130 | 1.40 | 1.35-0.88 | 2.16 | 6.80 | 31.8 | 3.2 | 0.1401 | 26.9% |
| 90% | 193.5 | 9.9 | 0.125 | 1.24 | 1.20-0.77 | 1.98 | 4.38 | 26.8 | 2.2 | 0.1211 | 26.5% |
| 100% | 215.0 | 9.0 | 0.120 | 1.08 | 1.04-0.64 | 1.80 | 2.75 | 21.9 | 1.4 | 0.1043 | 25.9% |

FIG. 5A

| Blade and Rotor | | | |
|---|---|---|---|
| | Conventional | OSR 01 | Ratio (OSR/Conv.) |
| Blade Weight/Area (lb/ft$^2$) | 6 | 2.8 | 0.47 |
| Blade Root Stiffness (EI x 10$^6$ lb*in$^2$) | 2 | 170 | 85 |
| Blade Mass Moment of Inertia (Slug x ft$^2$) | 48 | 120 | 2.5 |
| Rotor Type | Articulated | Hingeless | — |
| No. of Blades | 4 | 3-4 | 0.75-1 |
| Helicopter Max. Gross Weight (lb) | 2550 | 2500-4000 | 1-1.6 |
| Max. Disc Loading (lb/ft$^2$) | 4.7 | 2.5-4 | 0.53-0.85 |
| RPM Range | 468 | 150-350 | — |
| Tip Mach Number | 0.58 | 0.25-0.58 | 0.43-1.0 |

FIG. 7A

Blade Dimensions & Weights

| | Conventional | OSR 01 | Ratio (OSR/Conv.) |
|---|---|---|---|
| Blade Area (ft²) | 6.5 | 18 | 2.77 |
| Blade Taper Ratio | 1 | 0.5 | 0.5 |
| Thickness Ratio | 12% | 12%-17.5%* | 1-1.46 |
| Max. Thickness (in) | 0.81 | 2.83* | 3.5 |
| Material | Aluminum | Carbon/Epoxy | --- |
| Blade Weight (lb) | 39 | ~50 | 1.34 |

*At 20% radius

FIG. 7B

OPTIMUM SPEED ROTOR

CROSS REFERENCE TO RELATED APPLICATION

This application claims the benefit of U.S. provisional patent Application No. 60/075,509, filed Feb. 20, 1998, the contents of which are hereby incorporated by reference.

FIELD OF THE INVENTION

This invention relates to helicopters and specifically to helicopters having variable speed rotors for achieving substantial increases in endurance, range, altitude and speed and reductions in noise levels and fuel consumption.

BACKGROUND OF THE INVENTION

The efficiency of an aircraft, whether fixed wing or rotorcraft, as expressed by the fuel consumption required to achieve a specific performance as for example, cruise, climb, or maximum speed, is directly proportional to the power required to achieve such performance. The power required is inversely proportional to the ratio of the aircraft lift to the drag (L/D). In order to increase an aircraft efficiency designers strive to increase the lift to drag ratio by minimizing the aircraft drag at lift levels required to counter the aircraft weight and to allow for aircraft maneuvering.

The lift and drag of an aircraft are determined by the following formulas, respectively:

$$L = \tfrac{1}{2}\rho V^2 S C_L \quad (1)$$

$$D = \tfrac{1}{2}\rho V^2 S C_D \quad (2)$$

Where $\rho$ is the air density, V is the air velocity (airspeed), S is the reference area of the lifting surface (wing or rotor blade), $C_L$ and $C_D$ are non-dimensional lift and drag coefficients. The lift to drag ratio L/D is equal to coefficient of lift to the coefficient of drag ratio, $C_L/C_D$. Thus, the ratio of the coefficient of lift to the coefficient of drag, $C_L/C_D$, has a direct effect on performance. The $C_L/C_D$ is a function of $C_L$ as can be seen by the $C_L$v. $C_L/C_D$ graph depicted in FIG. 1 for a typical airfoil. For best cruise efficiency, the coefficient of lift of the lifting airfoil should be maintained at levels of maximum $C_L/C_D$.

In a helicopter the lift and drag of the rotor blades conform to the same lift formula $L=\tfrac{1}{2}\rho V^2 S C_L$ where V is the local airspeed on the blade which, in a hovering helicopter is a result of the blade angular velocity in revolutions per minute (RPM). For convenience, "RPM" as used herein refers to rotor angular velocity. Moreover, the term "helicopter" as used herein encompasses all types of rotorcraft.

In a hovering helicopter, the speed of the rotor blade increases radially outward. At any given radial distance from the rotor center, the speed of the blade is given by the equation:

$$v_r = \frac{2\pi r \, (RPM)}{60} \quad (3)$$

where, $v_r$ is the rotational speed and r is the radial distance measured from the rotor center.

A helicopter in a substantial forward speed (e.g., 100–200 mph) experiences problems of control, vibration and limitations in performance resulting from the asymmetry in the speeds of the advancing and retreating blades. When traveling in a forward direction 8, the advancing blade 10 has a speed equal the rotational speed of the blade plus the forward speed of the helicopter, whereas the retreating blade 12 has a speed equal the rotational speed of the blade minus the forward speed of the helicopter. The speeds along the length of the blades when traveling forward are shown in FIG. 2. As a result, the advancing blade has more lift than the retreating blade. To avoid helicopter roll over due the airspeed asymmetry, the lift on the retreating blade has to be increased while the speed on the advancing blade has to be decreased. Because, lift is inversely proportional to the velocity (i.e., speed) of the blade squared ($V^2$) a substantial increase in the coefficient of lift ($C_L$) of the retreating blade is required. The available lift coefficient for a given blade is limited as shown FIG. 1. Consequently, the asymmetry in speeds between the advancing and retreating blades has to be limited thereby limiting the forward speed of the helicopter.

Increasing the RPM of the rotor reduces the relative asymmetry of the airspeed distribution, thus reducing the effects of forward speed on roll control limits. But such RPM increase is constrained by the maximum allowable rotor tip speed. The maximum allowable tip speed is typically lower than the speed of sound (i.e., Mach 1) so as to avoid the substantial increases in drag, vibration and noise encountered when the tip speed approaches Mach 1.

Current helicopter rotors turn at a constant RPM throughout the flight because of the complex and severe rotor dynamics problems. Generally, helicopter designers are content if they succeed in the development of a single speed rotor, which can go from zero to design RPM when not loaded on the ground during start and stop without encountering vibration loads which overstress the helicopter and rotor structure. When the blades of a conventional rotor are producing lift, a significant change of the rotor blade RPM from the design RPM may yield catastrophic results.

Conventional helicopter rotors are designed to achieve blade flap, lag and torsional natural oscillation frequencies, at the operating RPM, which are adequately separated from the rotor excitation frequencies occurring at the rates of 1 per revolution, 2 per revolution, 3 per revolution and so forth. For example, for a rotor operating at 360 RPM, the frequency corresponding to the occurrence of a rotor excitation frequency of 1 per revolution is 6 Hz (360 RPM is 6 cycles per second), 2 per revolution is 12 Hz, and so forth. As the rotor RPM is changed so are the excitation frequencies. For convenience, the frequencies which give rise to these excitation frequencies are referred to herein by the excitation frequency occurrence rates. For example a frequency that gives rise to an excitation frequency that occurs at a rate of 2 per revolution is referred to herein as the "2 per revolution" frequency. For good dynamic behavior, considering both blade loads and helicopter vibration, conventional rotors with any number of blades are designed to avoid the frequencies of 1 per revolution, 2 per revolution, 3 per revolution and so forth. Conventional rotor blades are designed to operate at 100% of design RPM with the fundamental flap mode at a frequency above the 1 per revolution frequency, the fundamental lag mode usually below the 1 per revolution frequency and sometimes between the 1 per revolution and the 2 per revolution frequencies, and the blade dynamics tuned so that higher flap, lag torsion modes avoid the 1, 2, 3, 4, . . . n per revolution frequencies. The conventional blade design modes (i.e., modal frequencies) must be kept separated from the 1, 2, 3, 4, . . . n per revolution frequencies to avoid the generation of vibration loads which may be catastrophic. As a minimum, such vibration loads will make the helicopter unacceptable for the pilot and passengers and detrimental to the reliability of its mechanisms and equipment. To avoid such vibration loads, the rotor angular velocity is limited to a narrow range around 100% of design RPM, except for start-up and shut-down at low or no rotor load and low wind speed.

The RPM of helicopter rotors is normally set for a maximum forward speed at a maximum weight at a certain critical altitude. The RPM of the rotor is such that at maximum forward speed, the tip of the advancing blade is traveling at speeds near but below Mach 1, to avoid the substantial increases in drag, vibration and noise encountered at speeds approaching Mach 1. At any other flight conditions, the rotor RPM and thus, the power required to turn the rotor are substantially higher than that required for efficient operation.

Some research helicopters such as the Lockheed XH-51A compound helicopter have experimented with rotor RPM reduction at certain flight conditions by incorporating a wing for producing most of the required lift and a jet or a propeller driving engine for producing the required forward thrust. The use of the wings and engine relieve the rotor of its duty to produce lift and thrust, thus allowing the unloaded rotor to operate at reduced RPM. In this regard, a helicopter can fly at higher speeds before the tip of the advancing blade approaches the speed of sound and encounters the increased levels of vibration and noise as well as drag.

Another aircraft, the V-22 Osprey incorporates 2-speed tilt rotors. The V-22 Osprey aircraft has wings for generating lift. The rotors are typically "tilted" from a first position where their axis of rotation is vertical and where the rotor acts as a regular helicopter rotor to a second position where their axis of rotation is relatively horizontal and the rotor acts as a propeller producing forward thrust. When at their first position these rotors operate only to create lift for vertical take-off and landing and for hovering. When the needing to go forward, the rotors are "tilted" to provide the forward thrust. When in a "tilted" position providing forward thrust, the RPM of the rotor can be varied much like a variable speed propeller.

Other attempts have been made in improving helicopter maximum forward speeds and/or reducing noise at maximum speed by using 2-speed gearboxes. These gearboxes allow the rotor to rotate at two RPM values while maintaining a constant engine RPM. The rotor is set to rotate at a lower RPM when at high forward speed so as to reduce the rotor tip speed. In all other conditions, the rotor is set to rotate at the higher RPM. However, these attempts do not substantially improve the efficiency of the helicopter by reducing fuel consumption.

Another helicopter uses 10% reduction in rotor RPM during takeoff and landing in order to conform to very strict noise limitations. Because of this reduction in rotor RPM, the helicopter performance is compromised during take-off and landing.

While these aforementioned endeavors attempted to increase maximum speed and reduce noise during take-off and landing, neither attempted to improve the efficiency of the helicopter. Neither attempted to reduce the fuel consumed and power required for a given performance or attempted to increase a helicopter performance without increasing the fuel consumed and the power required. As such there is a need for a helicopter rotor system which will improve helicopter range, altitude and speed performance while reducing fuel consumption and noise levels.

SUMMARY OF THE INVENTION

The present invention provides a variable speed rotor and a method for using the same for improving helicopter performance and efficiency while reducing fuel consumption. The RPM of the rotor system of the present invention can be varied to multiple and even infinite settings depending on the helicopter flight conditions to maintain a blade loading for optimum performance and fuel efficiency. The present invention allows for reduced rotor RPM at reduced forward speeds achieving an increase in rotor blade lift coefficient at the lower forward speeds and higher blade lift to drag ratio and thus, higher aerodynamic efficiency, lower required power, fuel consumption and noise level. By decreasing the RPM of the rotor, the power required to drive the rotor at the decreased RPM is also decreased. The adjustment to rotor RPM and power can be accomplished manually or automatically as for example by computer.

In order to be able to operate over a wide RPM range, the rotor system of the present invention is designed specifically to be able to operate close to or on rotor excitation frequencies. To achieve such unique capability, the rotor blades are designed to be very stiff and lightweight. The blades should be substantially stiffer and lighter than conventional rotor blades.

In an exemplary embodiment, the rotor blades flap, lag and torsion stiffness as well as the blade weight per unit length are continuously decreasing from the blade root to the blade tip. As a general rule, applicant discovered that to achieve operation at a wide range of angular velocities, the blades of the present invention require a flap stiffness and a blade weight as follows:

| | | |
|---|---|---|
| Flap Stiffness: | $EI_{flap} \geq 25\ D^4$ | at 10% of rotor radius measured from the center of rotor rotation |
| | $EI_{flap} \geq 10\ D^4$ | at 30% of rotor radius measured from the center of rotor rotation |
| Total Blade Weight: | $W \leq 0.0015 D^3$ | | where D is the rotor diameter and is measured in feet, W is pounds, and EI is in lbs-in$^2$.

DESCRIPTION OF THE DRAWINGS

FIGS. 4A, 4B, and 4C are top, side and end views, respectively of an exemplary embodiment blade of the present invention.

FIG. 5A is a table depicting design data for the exemplary embodiment blade shown in FIG. 4A.

FIG. 7A depicts a table comparing the exemplary embodiment blade shown in FIG. 4A to a conventional helicopter blade for use on an articulated rotor.

FIG. 7B depicts a further table comparing the exemplary embodiment blade shown in FIG. 4A to a conventional helicopter blade for use on an articulated rotor.

DETAILED DESCRIPTION OF THE INVENTION

The present invention provides for an optimum speed rotor whose RPM can be varied to multiple and even infinite settings depending on the helicopter flight conditions for optimum flight performance. The optimum speed rotor system of the present invention when incorporated on a helicopter allows for a substantial improvement in range, altitude and airspeed with less fuel consumption and noise levels. For descriptive purposes the optimum speed rotor system of the present invention is referred to herein as Optimum Speed Rotor or OSR. The OSR can be driven by any powerplant such as a reciprocating engine or a turbine engine.

The present invention allows for reduced rotor RPM at reduced forward speeds and/or at reduced rotor lift achieving an increase in rotor blade lift coefficient and higher blade lift to drag ratio and thus, higher aerodynamic efficiency, lower required power, fuel consumption and noise level. The present invention OSR is able to accomplish this while being fully loaded, i.e., while producing lift without the aid of a fixed wing.

Because the lift coefficient of a rotor blade varies along the blade length as well as with the blade angular position, it is common to evaluate the lift characteristics of a rotor blade by ascertaining its loading. Blade loading ($C_T/\sigma$) is a parameter which is a function of the rotor blade average lift coefficient ($C_L$) and is defined by the equation:

$$C_T = \frac{T}{S\sigma\rho V_T^2} \quad (4)$$

where T=rotor thrust, S=rotor disc area, $V_T$ rotor tip speed

T is approximated at T=nW where n is the vertical maneuver factor and W is the helicopter weight. The solidity factor, $\sigma$, is the ratio of weighted total blade area to the rotor disc area.

$$V_T = \frac{2\pi R \text{ (RPM)}}{60} \quad (5)$$

Figure 1:
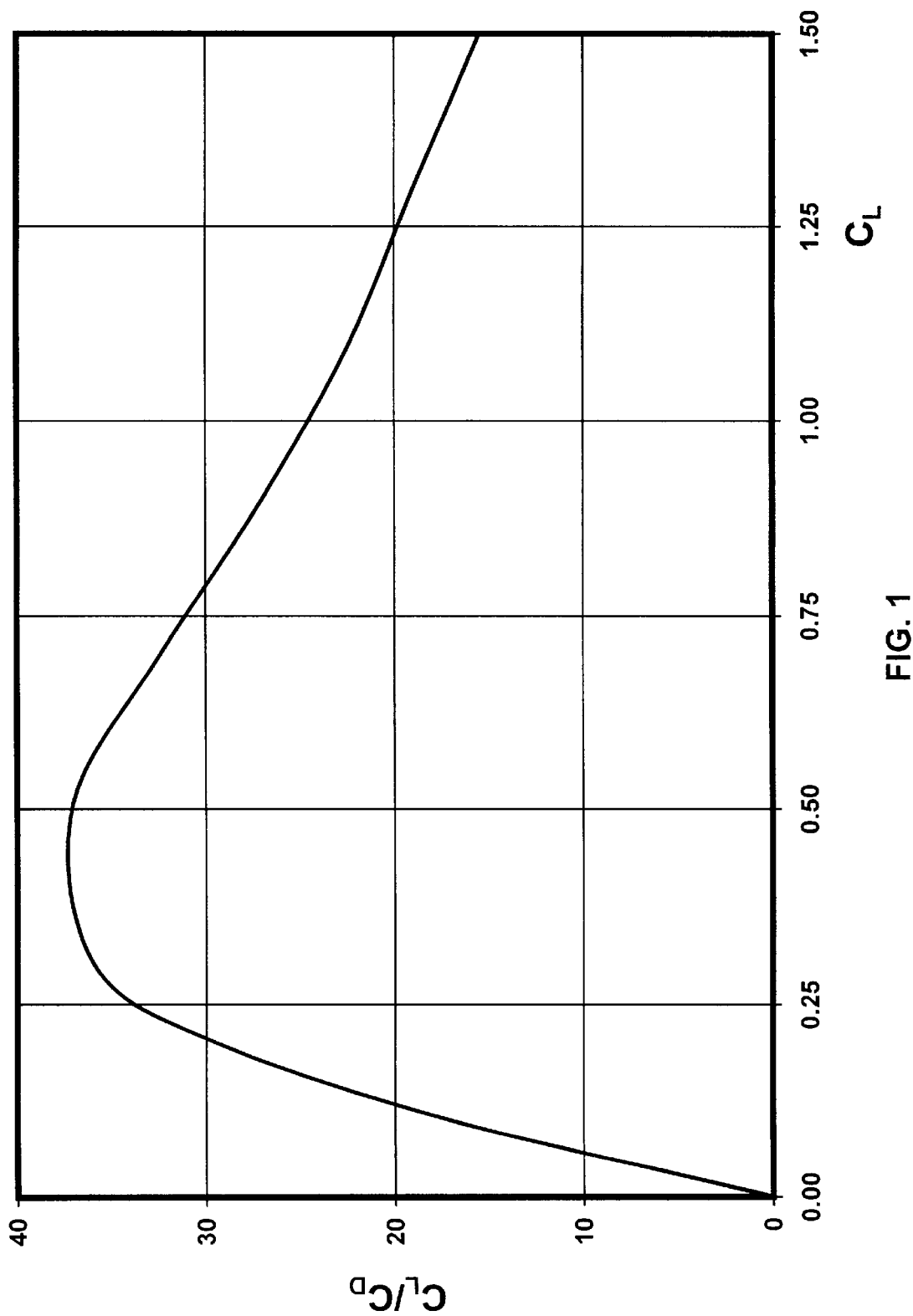
FIG. 1 depicts a graph the ratio of Coefficient of Lift to Coefficient of Drag v. Coefficient of Lift for a typical airfoil.
Figure 2:
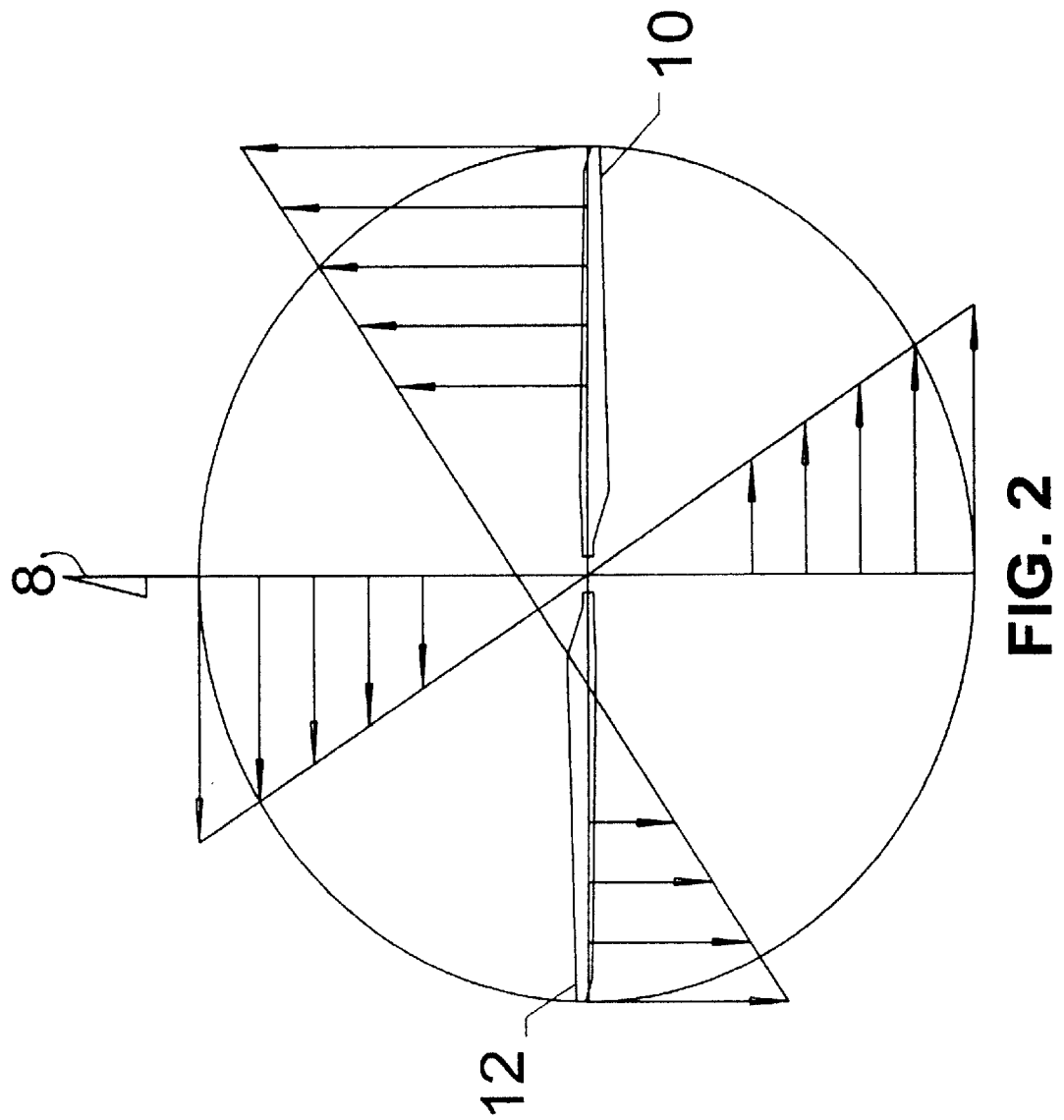
FIG. 2 is a schematic of an airspeed distribution of rotor in forward flight.
Figure 3:
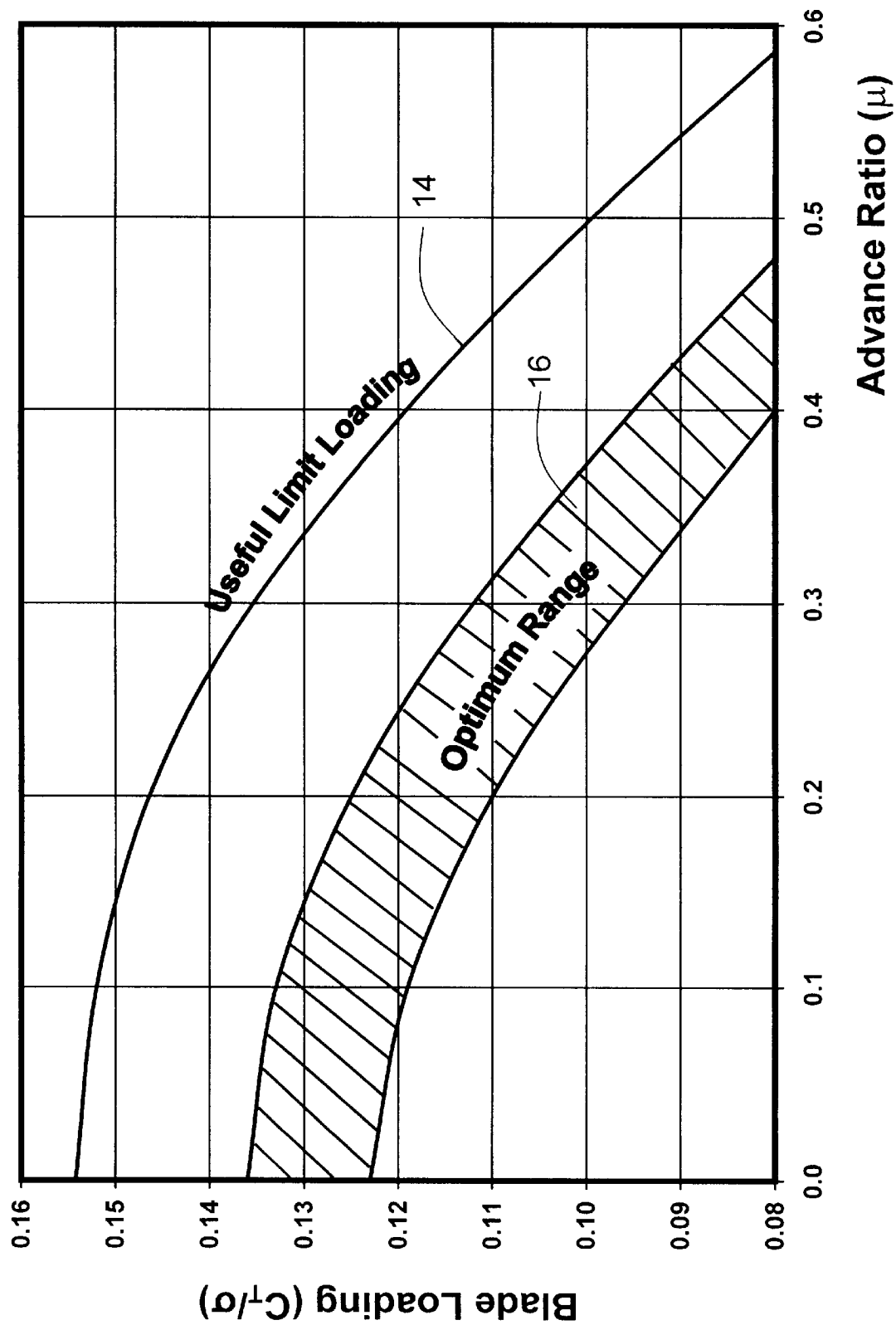
FIG. 3 depicts a graph of Blade Loading v. Advance Ratio showing a useful limit blade loading and an optimum range of blade loadings for a typical helicopter.

The term "blade loading" or "rotor blade loading" as used herein refers to $C_T/\sigma$. The useful limit of blade loading for any helicopter rotor system can be derived experimentally, i.e., through flight testing. The usefull limit blade loading for a typical rotor system is given in FIG. 3 by curve 14 as function of the helicopter advance ratio m, i.e., the ratio of helicopter forward speed to the rotor tip rotational tip speed $V_T$. As can be seen from FIG. 3 at advance ratios greater than 0.4, there is a sharp decline of blade loading limit. Thus, to avoid the sharp reduction of rotor lift limit, at a maximum forward speed a certain minimum rotor RPM has to be maintained to avoid increasing the advance ratio beyond 0.4–0.5. An optimum range 16 of blade loading can also be derived through flight test for a specific helicopter rotor system as a function of advance ratio as shown in FIG. 3. For a given advance ratio, the optimum blade loading range is defined by the blade loadings required to optimize the various flight performance parameters such as endurance, range, and climb rate.

The OSR of the present invention allows for the adjustment to the rotor RPM to maintain a blade loading within the optimum range. By operating below 100% of RPM, the power required to drive the rotor at the decreased RPM is also decreased. The adjustment to rotor RPM and power can be accomplished manually or automatically as for example by computer. In a manual OSR system, for best endurance, the pilot will manually adjust the rotor RPM and engine power to minimize fuel consumption (either directly measured or by observing an indication of engine power). For best cruise range, the pilot will adjust RPM and airspeed for maximizing the miles traveled per unit of fuel. In climb at a given power setting, the pilot will adjust the rotor RPM and airspeed for maximizing the climb rate. An automated OSR will operate the same way. Information such as fuel consumptions and miles traveled per unit of fuel consumed will be monitored by the computer. The pilot will select the flight performance parameter that needs to be optimized, e.g., range, endurance, rate of climb, etc. and the computer will adjust the rotor RPM, power and airspeed settings accordingly for maximizing the selected performance. Alternatively, the optimum blade loading range as a function of advance ratio is predetermined from flight testing and stored on the computer which in turn will adjust the rotor RPM and power settings so as to maintain the blade loading within the predetermined range for any pilot controlled airspeed and rate of climb.

Applicant discovered that he can overcome the structural dynamics problems associated with significant changes of rotor RPM by building a rotor system consisting of blades 18 having reduced mass and increased stiffness (FIGS. 4A, 4B, 4C and 7B). The applicant was able to design a blade having a continuously decreasing flap, lag and torsion stiffness from the root 20 to the tip 22 of the blade and having continuously decreasing mass from the root to the tip of the blade. The flap 24, lag 26 and torsional 28 directions are depicted in FIGS. 4B, 4C and 4D, respectively. These blades when mounted on a rotor hub will allow for significant changes in rotor RPM without being subject to the structural dynamics problems of conventional blades. An exemplary embodiment of such a blade is shown in FIGS. 4A, 4B and 4C which is made of a carbon-epoxy advanced composite material.

In order to be able to operate over a wide RPM range, the OSR is designed specifically to be able to operate close to or on rotor excitation frequencies. The OSR is capable of operating a long time under fill rotor lift load at or near such frequencies. To achieve such unique capability, the OSR rotor blades are designed to be very stiff and lightweight. By increasing the stiffness of the blades in flap in relation to the feathering axis 30 (FIG. 4A), the blade is better able to operate at or near the rotor excitation frequencies. Lag stiffness tends to be less sensitive to the excitation frequencies but if kept at a ratio to flap stiffness of on average greater than 2 it helps reduce oscillatory lag loads and helicopter vibration levels.

The OSR rotor blades should be substantially stiffer and lighter than conventional rotor blades. As a general rule, applicant discovered that to achieve operation at a wide range of angular velocities, the OSR blades require a flap stiffness and a blade weight as follows:

| | | |
|---|---|---|
| Flap Stiffness: | $EI_{flap} \geq 25\ D^4$ | at 10% of rotor radius measured from the center of rotor rotation |
| | $EI_{flap} \geq 10\ D^4$ | at 30% of rotor radius measured from the center of rotor rotation |
| Total Blade Weight: | $W \leq 0.0015 D^3$ | | where D is the rotor diameter and is measured in feet, W is pounds, and EI is in lbs-in$^2$.

Figure 5B:
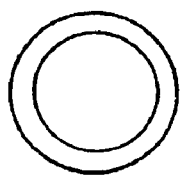
FIG. 5B is a cross-sectional view of the shank of the exemplary embodiment blade shown in FIG. 4A.
Figure 5C:
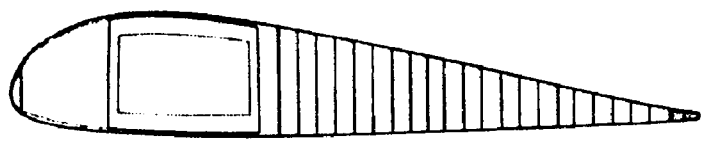
FIG. 5C is a cross-sectional view of the exemplary embodiment blade shown in FIG. 4A at the blade 20% station.
Figure 5D:
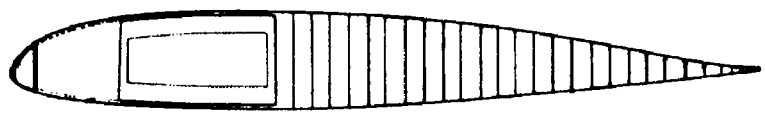
FIG. 5D is a cross-sectional view of the exemplary embodiment blade shown in FIG. 4A at the blade 70% station.

The exemplary OSR blade of the present invention shown in FIGS. 4A, 4B and 4C has a length 32 including the shank 33 of about 17.84 feet, a maximum width 34 of about 18 inches and a minimum width 36 at its tip of about 9 inches (FIG. 4A). The blade has a shank length 40 of about 14 inches and a shank diameter 42 of about 3.75 inches. The exemplary blade has the dimensions (in.), stiffness (lbs-in$^2$) and weights per unit length (lbs/in.) depicted in table of FIG. 5A. As can be seen from FIG. 5A, the exemplary blade has a continuously reducing flap and lag stiffness from the hub center to the blade tip. The blade cross-sections at the blade 20% station 5C–5C, and the 70% station 5D–5D, are depicted in FIGS. 5C and 5D, respectively. The 20% and 70% stations are at 20% and 70% of the rotor radius, respectively, as measured from the center of rotor rotation. The cross-section of the blade shank is depicted in FIG. 5B. The blade is constructed of a carbonepoxy spar/shank and a carbon epoxy leading edge. The trailing edge is a lightweight section made of thin carbon-epoxy top and bottom skins and a fill-depth honeycomb core.

In the exemplary OSR blades, adequate torsional stiffness was easily achieved. In stiffer OSR blades the use of a hub flexbeams provide for a flap and lag effective spring inboard of the feathering axis 30 to reduce the load and vibration levels typical of rigid rotor blades. But, the spring rate of such flexbeams is not "tuned" to avoid natural frequency/RPM "crossings" i.e., the rotor excitation frequencies.

Figure 6:
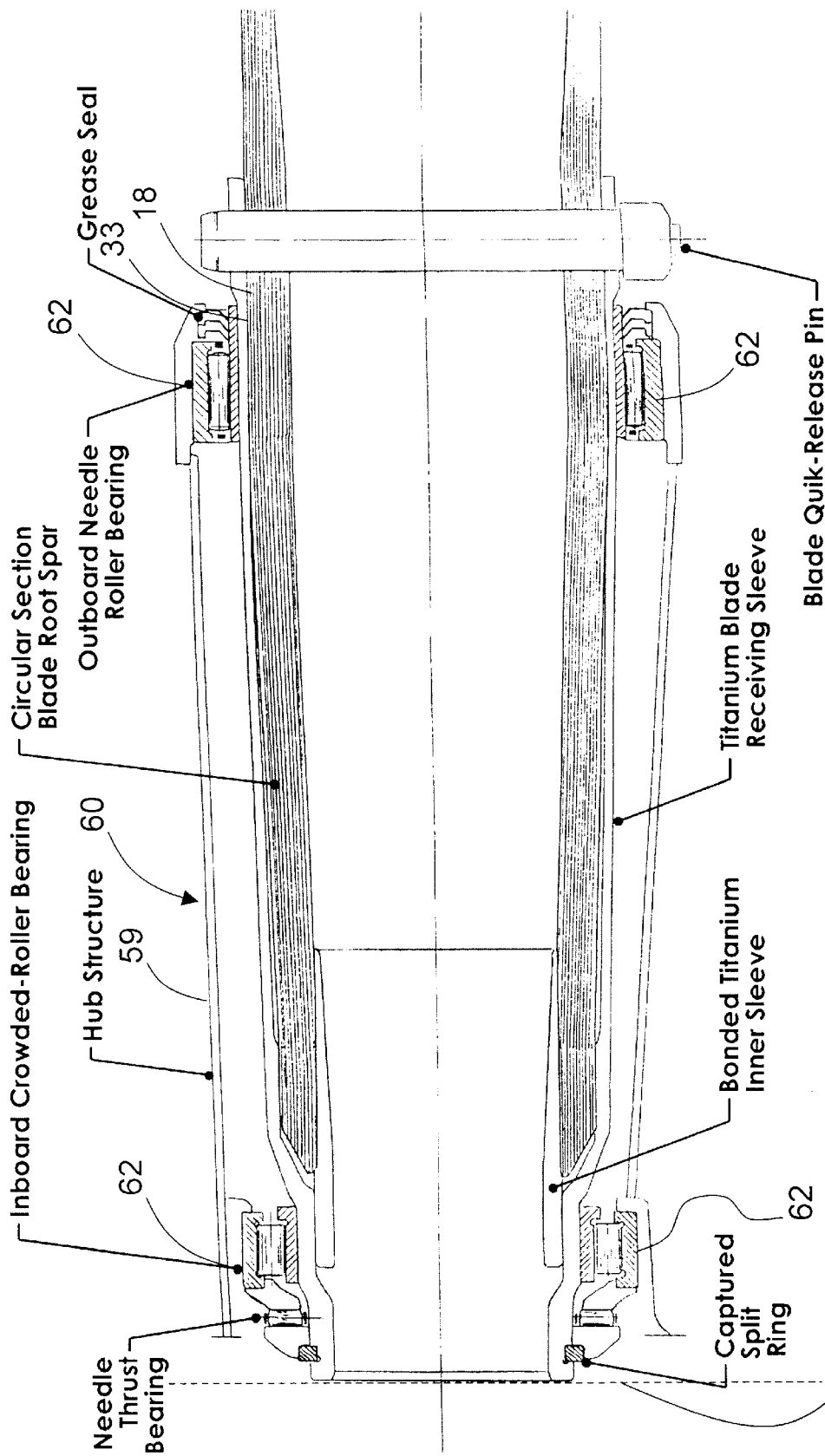
FIG. 6 is a partial cross-sectional view of the shank of the exemplary embodiment blade shown in FIG. 4A mated to a hingeless rotor.

The blades can be mounted in any type or rotor hub such as hingeless, teetering or articulated, to form the rotor system. However, in a preferred embodiment, the blades are mounted in a hingeless rotor system. A hingeless rotor is well known in the art. It consists of sleeves 59 for mounting the blades 18 The sleeves are fixed relative to the hub mast 61 When mounted on a hingeless rotor hub 60, the blades can not pivot in the flap and lag directions relative to the hub (FIG. 6). The preferred embodiment hingeless rotor is made of steel. The rotor hub structure is chosen to have a hub stiffness in flap and lag matched to the blade corresponding stiffness at the blade root. The bearing system 62 incorporated for blade pitch changes about the feathering axis is also required to resist moments that are substantially greater than those for an articulated rotor system.

Figure 7C:
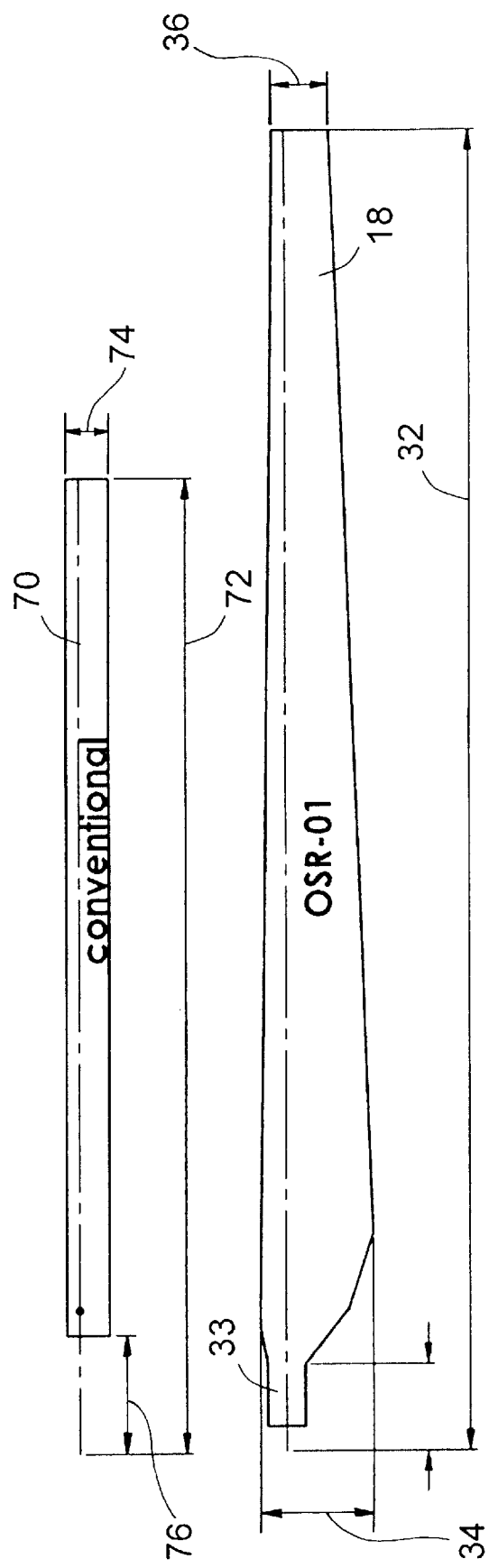
FIG. 7C depicts top views of the two blades being compared in FIGS. 7A and 7B.

FIGS. 7A and 7B present two tables, respectively, comparing dimensions and design parameters of the exemplary OSR blade incorporated in a hingeless rotor to a conventional blade of an articulated rotor system. FIG. 7C depicts a scaled comparison between the OSR blade 18 the conventional blade 70 being compared in the tables of FIGS. 7A and 7B. The compared conventional blade 70 has a length 72 of about 13.17 feet, a constant width 74 of about 6.75 inches and a shank length 76 of about 19 inches. As can be seen from FIG. 7A, the OSR blades are 85 fold stiffer at about 10% radius than the conventional articulated rotor blades which are hinged at the root in the flap direction (up-down) and lag direction (forward-aft in the plane of the rotor). The conventional blades must be heavy enough in order to achieve adequate centrifugal forces to avoid excessive upward bending ("coning angle"). In spite of its 85 fold increase in stiffness the OSR blades weight per blade surface area is less than half that of the conventional blade. This increase in stiffness and reduction in weight per blade surface area is achieved on the OSR blades by 3.5 fold increase in maximum blade thickness using tapered planform, large root chord and thick root airfoils and use of high stiffness/weight carbon-epoxy materials. The stiff light weight OSR blades do not require weights at their tips as do conventional blades.

A rotor system of the present invention can operate from 0 to 100% RPM under full lift load without reducing the rotor structural integrity. Moreover, the vibration levels produced by the rotor of the present invention are within acceptable levels as related to crew fatigue, passenger comfort and payload performance. The rotor systems of the present invention are able to avoid the structural stability, loads and vibration problems associated with the operation of the rotor over a wide range of RPM.

The exemplary embodiment OSR blades mounted on a hingeless rotor forminig an exemplary OSR were analyzed, optimized and its performance verified using 9 integrated dynamics analysis tools for Computational Fluid Dynamics, structures, structural dynamics and control dynamics. The most important of these tools is CAMRAD II (originated by Wayne Johnson and available Analytical Methods Inc, Redmond, Wash.) which was used extensively for evaluating rotor stability, loads, vibrations, performance and control, including Higher Harmonic Control. All performance and structural dynamic data presented are results of CAMRAD II runs with non-uniform inflow. In the extensive CAMRAD II analysis, the exemplary OSR exhibited no rotor dynamics instability anywhere in the design RPM range.

The CAMRAD II analysis revealed that the exemplary OSR can reduce its angular velocity to as low as 150 RPM (tip Mach number of 0.25) or at any other interim RPM to optimize lift/drag ratio, reduce power and achieve longer endurance and range or achieve higher altitude and forward speed for the same power level. It is expected that the rotor RPM of an OSR can be lowered to as much as 40% of the maximum rotor design RPM while providing the required lift for a helicopter at its minimum weight.

Figure 8:
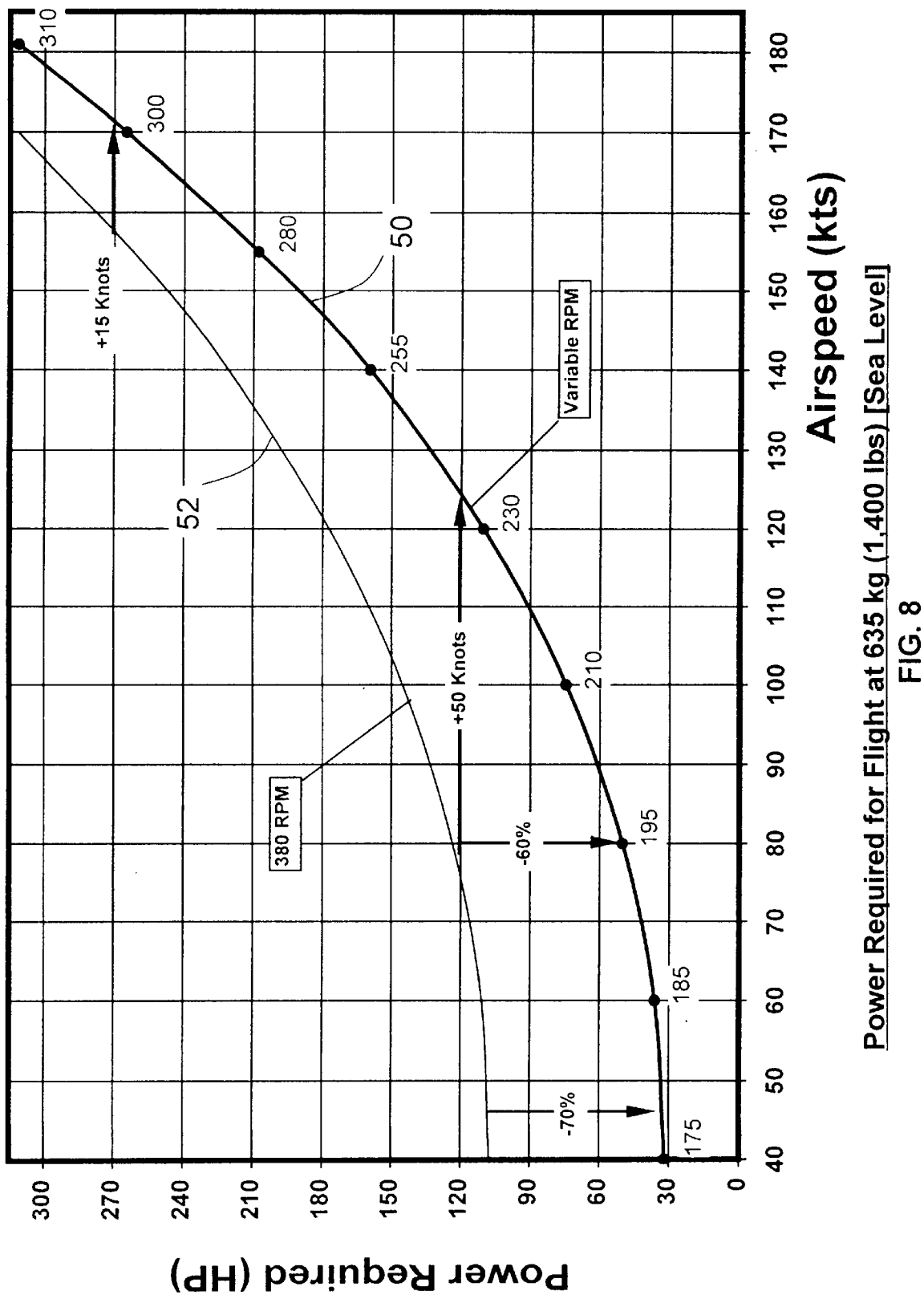
FIG. 8 is a graph of Airspeed v. Power Required for helicopter operating with the rotor system of the present invention at variable speed and at 380 RPM at sea level at low weight of 1400 lbs.
Figure 9:
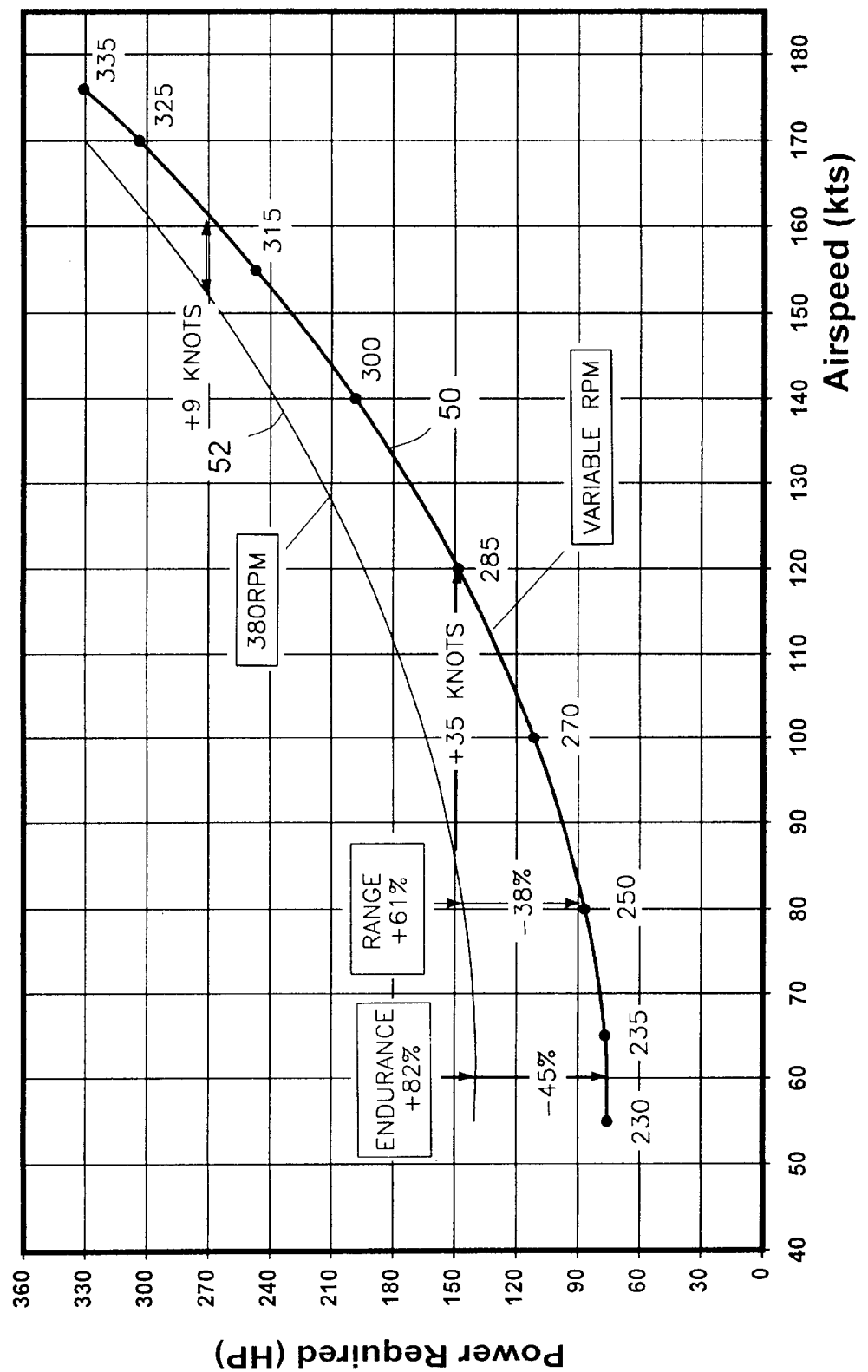
FIG. 9 is a graph of Airspeed v. Power Required for helicopter operating with the rotor system of the present invention at variable speed and at 380 RPM at sea level at medium weight of 2600 lbs.
Figure 10:
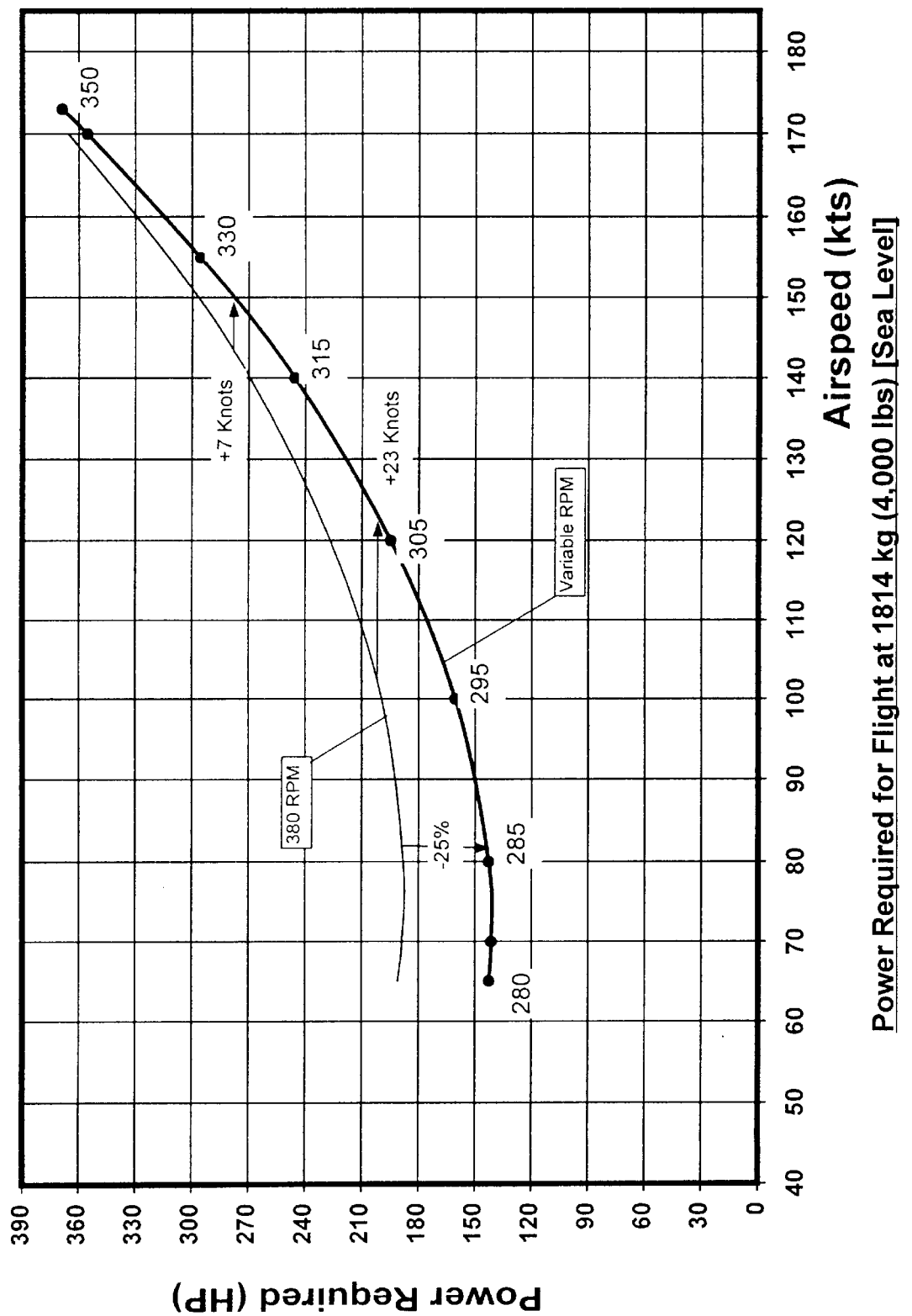
FIG. 10 is a graph of Airspeed v. Power Required for helicopter operating with the rotor system of the present invention at variable speed and at 380 RPM at sea level at high weight of 4000 lbs.

FIGS. 8–10 depict power requirements when operating the OSR of the exemplary embodiment consisting of 3 blades and a hingeless hub, using a low drag unmanned helicopter fuselage, at various RPM values for improved efficiency (curve 50) and when operating the same rotor at a constant angular velocity of 380 RPM (curve 52), at a helicopter weight of 1400 lbs, 2600 lbs, and 4000 lbs, respectively at sea level. FIGS. 8–10 were created from data obtained from the CAMRAD II analyses.

The advantage of OSR is dramatic at the lower speeds and light weight range (loiter at the end of fuel and with light payload). The reduction of 60%–70% in power required at 1400 lbs. at 40–80 knots (FIG. 8) provide an equal impact on fuel consumption. The reduction in tip Mach number (about 40%–50%) of the advancing blade may provide 10–15 dBA reduction rotor noise levels. The 15 knot increases in speed at constant power of 270 HP and the 50 knot increase at a constant power of 120 HP are dramatic and indicative of the level of inefficiency of conventional constant RPM rotors especially for a low weight helicopter loitering at low speed.

FIG. 9 shows the performance gains at an average weight of 2600 lbs. As can be seen form FIG. 8, the 45% reduction in required power and fuel consumption at a loiter speed of about 60 knots will provide an 82% increase in maximum endurance for the same total fuel capacity. Similarly, the 38% reduction in power required at 80 knots should provide a 61% increase in maximum range.

FIG. 10 shows that even at an overload weight of 4000 lbs. the reduction in power of about 25% required at 65–80 knots and the increase in speed at a constant power level are substantial.

A similar power required analysis conducted for hover Out of Ground Effect (OGE) indicated that OSR offers 23% increase in take-off weight with constant engine power (may provide double the payload weight in most helicopters) and 30% reduction in tip speed (may reduce noise level 8 dBA). The reduction in power required offers 7,000 feet increase in hover OGE ceiling out of ground effect with the same engine.

In an alternate embodiment, instead of operating at a wide range of RPM, the OSR can be made to operated at 2 or more angular velocities. With such an OSR, the benefits in efficiency will be substantial but not as great as the benefits achieved by using an OSR that operates over a wide range of RPM.

I claim:

1. A method for improving the efficiency of a helicopter for a specific flight condition, the helicopter comprising a rotor having radially extending blades and an engine for providing power to rotate the rotor, the method comprising the steps of:
   determining a rotor blade loading for improved efficiency for the flight condition, wherein said rotor blade loading is a function of RPM;
   ascertaining an RPM value for achieving the determined blade loading; and
   adjusting the RPM of the rotor to the ascertained RPM value.

2. A method as recited in claim 1 wherein the step of determining comprises the step of determining a range of blade loadings for improved efficiency for the flight condition, and wherein the step of ascertaining comprises the step of ascertaining an RPM range for achieving a blade loading within the determined range of blade loadings.

3. A method as recited in claim 1 wherein the step of adjusting comprises the step of adjusting the RPM of the rotor to an RPM level within a range of predefined RPM levels.

4. A method as recited in claim 3 wherein the step of adjusting comprises the step of adjusting the RPM of the rotor in a range of 40% to 100% of maximum rotor RPM.

5. A method as recited in claim 1 wherein the step of adjusting comprises the step of reducing the rotor RPM when the forward speed of the helicopter is reduced.

6. A method as recited in claim 1 wherein the helicopter comprises a hingeless rotor.

7. A method as recited in claim 1 wherein the blade comprises a root and a tip and wherein the blade stiffness in flap, lag and torsion are continuously decreasing from the blade root to the blade tip.

8. A method as recited in claim 1 wherein the blade comprises a root and a tip and wherein the weight per unit length of the blade continuously decreases from the blade root to the blade tip.

9. A method as recited in claim 1 further comprising the steps of:
   ascertaining an engine power level for achieving the determined blade loading for the flight condition; and
   adjusting the engine power to the ascertained power level.

10. A method as recited in claim 1 wherein the rotor has a radius measured from a center of rotor rotation and a diameter and wherein the blades have a flap stiffness and wherein at 10% of the rotor radius, the flap stiffness of the blade in lbs-in$^2$ is not less than 25 times the diameter of the rotor in feet to the fourth power.

11. A method as recited in claim 1 wherein the rotor has a radius measured from a center of rotor rotation and a diameter and wherein the blades have a flap stiffness and wherein at 30% of the rotor radius, the flap stiffness of the blade in lbs-in$^2$ is not less than 10 times the diameter of the rotor in feet to the fourth power.

12. A method as recited in claim 1 wherein the rotor has a diameter and wherein the total weight of each blade in lbs. does not exceed 0.0015 times the diameter of the rotor in feet cubed.

13. A method for improving helicopter performance by decreasing fuel consumption, the method comprising the steps of:
   providing a rotor driven to rotate by a powerplant;
   operating the rotor for providing lift;
   monitoring the fuel consumption; and
   varying the rotor RPM to any value required for reducing fuel consumption.

14. A method as recited in claim 13 wherein the step of providing comprises the step of providing a hingeless rotor.

15. A method as recited in claim 13 wherein the step of varying further comprises the step of varying the power output of the powerplant.

16. A method as recited in claim 13 wherein the step of varying further comprises the step of the varying the forward speed of the helicopter.

17. A method as recited in claim 13 wherein the monitoring step comprises monitoring distance traveled by the helicopter and fuel consumed, and wherein the varying step comprises varying the rotor RPM and helicopter forward speed for maximizing the distance traveled for every unit of fuel consumed.

18. A method as recited in claim 13 wherein the rotor comprises blades having a root and a tip and wherein the blade stiffness in flap, lag and torsion are continuously decreasing from the blade roots to the blade tips.

19. A method as recited in claim 13 wherein the rotor comprises blades having a root and a tip and wherein the weight per unit length of each blade continuously decreases from the blade root to the blade tip.

20. A method as recited in claim 13 wherein the rotor comprises radially extending blades, wherein the rotor has a radius measured from a center of rotor rotation and a diameter, and wherein the blades have a flap stiffness and wherein at 10% of the rotor radius, the flap stiffness of the blade in lbs-in$^2$ is not less than 25 times the diameter of the rotor in feet to the fourth power.

21. A method as recited in claim 13 wherein the rotor comprises radially extending blades, wherein the rotor has a radius measured from a center of rotor rotation and a diameter, and wherein the blades have a flap stiffness and wherein at 30% of the rotor radius the flap stiffness of the blade in lbs-in$^2$ is not less than 10 times the diameter of the rotor in feet to the fourth power.

22. A method as recited in claim 13 wherein the rotor comprises radially extending blades and a diameter and wherein the total weight of each blade in lbs. does not exceed 0.0015 times the diameter of the rotor in feet cubed.

23. A method for improving helicopter performance by reducing fuel consumption, the method comprising the steps of:
   providing a rotor driven to rotate by a powerplant;
   operating the rotor for providing lift;
   monitoring the fuel consumption; and
   varying the rotor RPM to any of at least three RPM values for reducing fuel consumption.

24. A method as recited in claim 23 wherein the rotor is a hingeless rotor.

25. A variable speed rotor for providing lift and thrust to a helicopter, the rotor having a radius measured from a center of rotor rotation and a diameter and comprising:
   a rotor hub; and
   at least two blades radially coupled to the hub, each blade having a root proximal the hub and a tip distal to the hub, wherein each blade weight in lbs. does not exceed the product of 0.0015 times the diameter of the rotor cubed and wherein the flap stiffness of each blade in lbs-in$^2$ at 10% of the rotor radius is not less than the product of 25 times the rotor diameter to the fourth power.

26. A rotor as recited in claim 25 wherein the flap stiffness of each blade is in lbs-in$^2$ at 30% of the rotor radius is not less than the product of 10 times the diameter to the fourth power.

27. A rotor as recited in claim 25 wherein the weight of each blade per unit length continuously decreases from the blade root to the blade tip.

28. A rotor as recited in claim 25 wherein the flap, lag and torsional stiffness of each blade continuously decrease from the blade root to the blade tip.

29. A variable speed rotor for providing lift and thrust to a helicopter, the rotor having a radius measured from a center of rotor rotation and a diameter and comprising:
   a rotor hub; and
   at least two blades radially coupled to the hub, each blade having a root proximal the hub and a tip distal to the hub, wherein each blade weight in lbs. does not exceed the product of 0.0015 times the diameter of the rotor cubed and wherein the flap stiffness of each blade in lbs-in$^2$ at 30% of the rotor radius is not less than the product of 10 times the rotor diameter to the fourth power.

* * * * *